(12) United States Patent
Zhu et al.

(10) Patent No.: US 8,767,658 B2
(45) Date of Patent: Jul. 1, 2014

(54) METHOD AND BASE STATION FOR SENDING UPLINK SCHEDULING GRANT CONTROL SIGNALING

(75) Inventors: Peng Zhu, Shenzhen (CN); Peng Hao, Shenzhen (CN); Bin Yu, Shenzhen (CN); Yuqiang Zhang, Shenzhen (CN); Yuxin Wang, Shenzhen (CN); Bo Jin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 92 days.

(21) Appl. No.: 13/511,480

(22) PCT Filed: Jun. 30, 2010

(86) PCT No.: PCT/CN2010/074781
§ 371 (c)(1),
(2), (4) Date: May 23, 2012

(87) PCT Pub. No.: WO2010/149100
PCT Pub. Date: Dec. 29, 2010

(65) Prior Publication Data
US 2012/0243496 A1    Sep. 27, 2012

(30) Foreign Application Priority Data

Dec. 14, 2009  (CN) .......................... 2009 1 0246968

(51) Int. Cl.
*H04W 4/00* (2009.01)
*H04W 74/00* (2009.01)
*H04W 74/08* (2009.01)

(52) U.S. Cl.
CPC ........ *H04W 74/006* (2013.01); *H04W 74/0833* (2013.01); *H04W 74/002* (2013.01)
USPC ............ 370/329; 370/344; 370/330; 375/267

(58) Field of Classification Search
USPC ......................................... 370/329
See application file for complete search history.

(56) References Cited

U.S. PATENT DOCUMENTS

2008/0311919 A1    12/2008  Whinnett et al.
2010/0142455 A1*   6/2010   Imamura ...................... 370/329

(Continued)

FOREIGN PATENT DOCUMENTS

| CN | 101330314 A | 12/2008 |
| CN | 101547135 A | 9/2009 |
| WO | WO 2009022294 A2 * | 2/2009 |

OTHER PUBLICATIONS

International Search Report for PCT/CN2010/074781.

*Primary Examiner* — Hassan Kizou
*Assistant Examiner* — Deepa Belur
(74) *Attorney, Agent, or Firm* — McClure, Qualey & Rodack, LLP (57) ABSTRACT

A method for sending uplink scheduling grant signaling and a base station, applied in an Advanced Long Term Evolution (LTE-A) system, the method includes: a base station, according to a number of clusters occupied with non-consecutive resource allocation by a Physical Uplink Shared Channel (PUSCH) of a scheduled user equipment in a component carrier, configuring at least one uplink scheduling grant signaling for the user equipment, wherein each uplink scheduling grant signaling indicates an allocation of resource for one or two clusters occupied by the PUSCH; and the base station allocating a Physical Downlink Control Channel (PDCCH) for each uplink scheduling grant signaling, and sending the uplink scheduling grant signaling to the user equipment. The flexibility of the resource allocation in the case of multiple clusters is enhanced, meanwhile the reliability of transmission of the scheduling grant signaling is ensured.

8 Claims, 4 Drawing Sheets

(56) References Cited

U.S. PATENT DOCUMENTS

| | | | |
|---|---|---|---|
| 2011/0085513 A1* | 4/2011 | Chen et al. | 370/330 |
| 2012/0129551 A1* | 5/2012 | Islam | 455/456.1 |
| 2012/0182950 A1* | 7/2012 | Chung et al. | 370/329 |

* cited by examiner

METHOD AND BASE STATION FOR SENDING UPLINK SCHEDULING GRANT CONTROL SIGNALING

CROSS REFERENCE RELATED APPLICATIONS

This application is a national phase of PCT/CN2010/074781 filed Jun. 30, 2010, which claims priority to China Application Serial No. 200910246968.1, filed Dec. 14, 2009, both of which are entirely incorporated herein by reference.

TECHNICAL FIELD

The present invention relates to mobile communication field, and particularly to a method for sending uplink scheduling grant control signaling and a base station.

BACKGROUND OF THE RELATED ART

The 3$^{rd}$ Generation Partnership Project Long Term Evolution (3GPP LTE, or LTE for short) system controls a transmission of Physical Uplink Shared Channel (PUSCH) of a User Equipment (UE) by way of base station centralized scheduling.

In a LTE system, PUSCHs of multiple user equipments in a cell performs a frequency division multiplexing on an uplink system bandwidth, i.e. PUSCHs of different user equipments are orthogonal in frequency domain. While the base station schedules the transmission of a PUSCH of a user equipment by an uplink scheduling Grant (UL grant for short) signaling. The uplink scheduling grant signaling is carried in a Downlink Control Information (DCI) format 0, and is sent to the scheduled user equipment by the Physical Downlink Control Channel (PDCCH).

The information of the uplink scheduling grant signaling included in DCI format 0 is as follows:

1. Frequency hopping marker bit;
2. Resource block allocation and frequency hopping resource allocation;
3. Modulation and Coding Scheme (MSC) and Redundancy Version (RV);
4. New data indicator;
5. Transmit Power Control (TPC) command for scheduled PUSCH;
6. Cyclic shift for DM RS (de-modulation reference signal);
7. Uplink index (UL index), which only exists in a Time Division Duplex (TDD) system, and is used when the Uplink-downlink configuration is 0;
8. Downlink Assignment Index (DAI), which exists in a time division duplex (TDD) system, and is used when the Uplink-downlink configuration is 1~6;
9. Channel quality Indicator (COI) request;

if the user equipment detects a PDCCH with DCI format 0, the user equipment sends the PUSCH on the assigned channel resource according to the uplink scheduling grant signaling included in the PDCCH.

The uplink resource allocation of the LTE system is in unit of resource block. A resource block is used to describe a mapping from a Physical Channel to a Resource Element (called as RE for short). Two resource blocks are defined in the system: a Physical Resource Block (called as PRB for short) and a Virtual Resource Block (called as VRB for short).

A Physical resource block occupies $N_{SC}^{RB}$ consecutive subcarriers in frequency domain, and occupies $N_{symb}^{UL}$ consecutive symbols in time domain. Wherein, $N_{SC}^{RB}=12$, subcarrier spacing is 15 kHz, that is, the width of one PRB in frequency domain is 180 kHz. For a Normal cyclic prefix (called as Normal CP for short), $N_{symb}^{UL}=7$, for an Extended cyclic prefix (called as Extended CP for short), $N_{symb}^{UL}=6$, that is, the length of one PRB in time domain is a slot (0.5 ms). Thus, a PRB includes $N_{symb}^{UL} \times N_{SC}^{RB}$ resource blocks. The index of the PRB in frequency domain is $n_{PRB}$, wherein $n_{PRB}=0, \ldots, N_{RB}^{UL}-1$, $N_{RB}^{UL}$ is the number of PRB corresponding to the width of the uplink system; the index pair of the RE is (k,l), wherein $k=0, \ldots, N_{RB}^{UL}N_{SC}^{RB}-1$ which is a frequency domain index, $l=0, \ldots, N_{symb}^{UL}-1$ which is a time domain index, then $$n_{PRB} = \left\lfloor \frac{k}{N_{SC}^{RB}} \right\rfloor.$$

Figure 1:
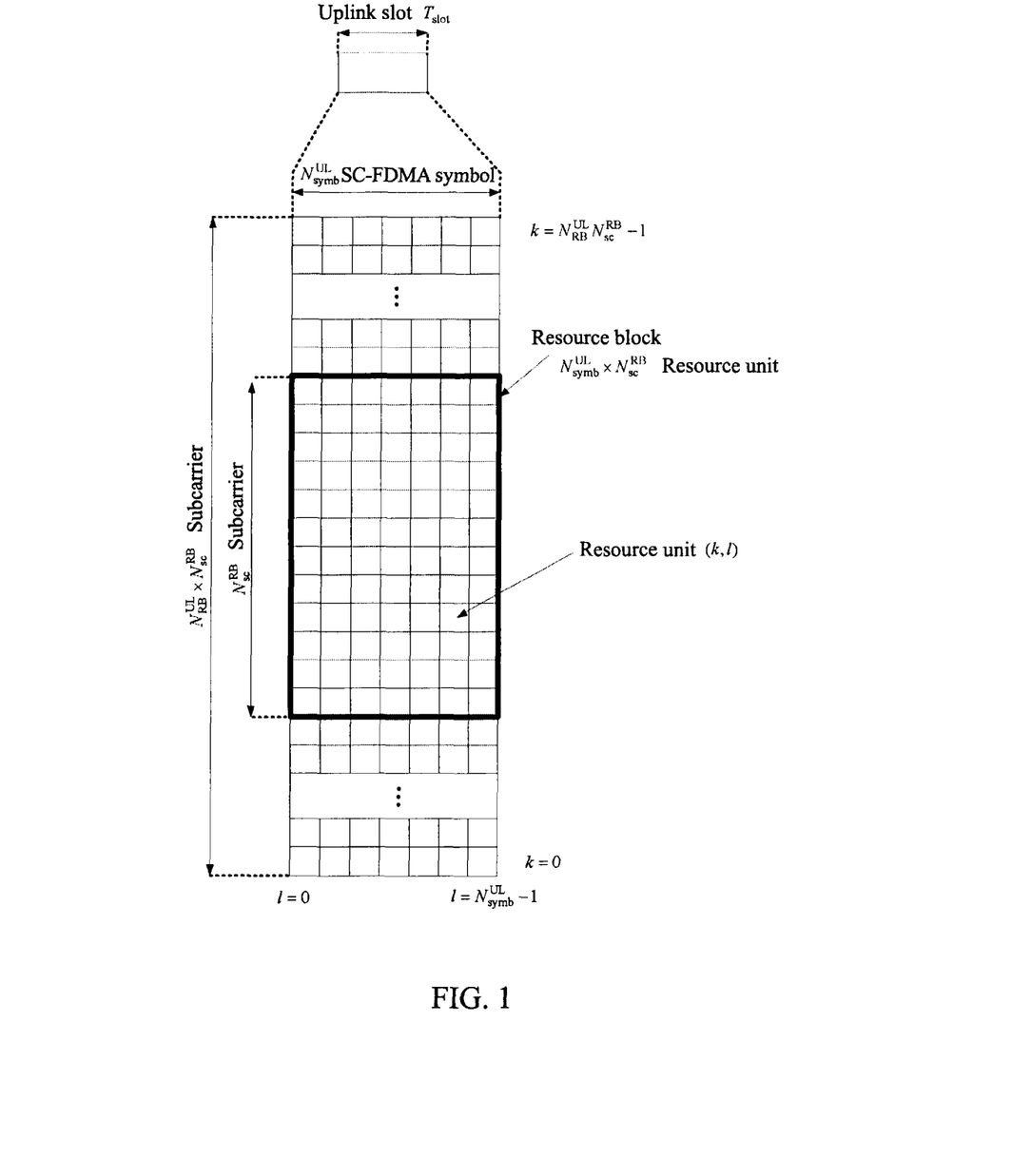
FIG. 1 is a structure schematic diagram of a physical resource block of an LTE system (taking a conventional cyclic prefix as an example)

Taking conventional cyclic prefix as an example, a structure of a PRB is as shown in FIG. 1.

A virtual resource block has a structure and a size which are the same as the PRB. Two types of VRB are defined: Virtual Resource Blocks (VRB) of distributed type and Virtual Resource Blocks (VRB) of localized type. In resource allocation, a pair of VRBs located at two slots in a sub-frame (each sub-frame includes two slots) are distributed together, one pair of VRBs has an index $n_{VRB}$.

The localized VRB is mapped to the PRB, i.e. $n_{PRB}=n_{VRB}$; in two slots in a sub-frame, the mappings from the localized VRB to the PRB are the same.

The distributed VRB needs to be mapped to the PRB according to a certain frequency hopping rule, and the frequency hopping rule is as follows:

$$n_{PRB}=f(n_{VRB},n_s).$$

Wherein, $n_s=0, \ldots, 19$ is the slot number of a radio frame (10 ms). In two slots in a sub-frame, mappings from a distributed VRN to the PRB are different.

Figure 2:
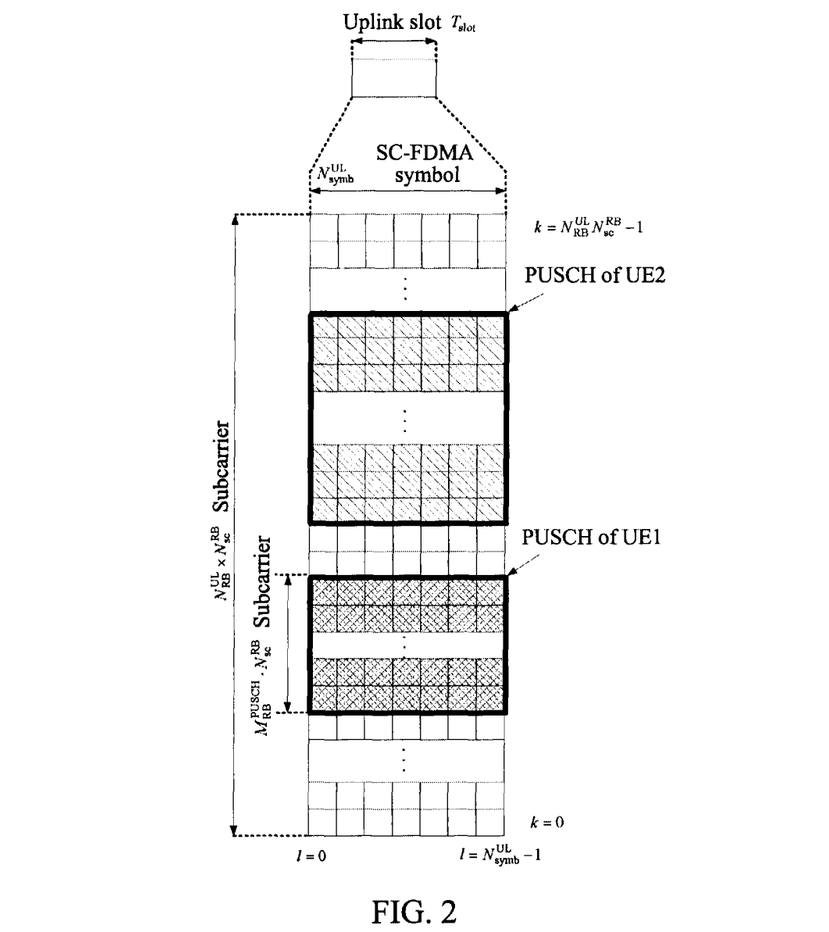
FIG. 2 is a structure schematic diagram of a physical uplink shared channel of an LTE system (a conventional cyclic prefix)

As shown in FIG. 2, in order to keep a single-carrier characteristic of the uplink signal, the PUSCH of the LTE system uses a consecutive resource allocation mode, i.e. a PUSCH of a user equipment occupies a section of consecutive bandwidth which is a part of the whole uplink system bandwidth in frequency domain. This section of bandwidth includes a group of consecutive PRB, wherein, the number of the PRB is $M_{RB}^{PUSCH}$, the number of the included consecutive subcarriers is $$M_{sc}^{PUSCH}=M_{RB}^{PUSCH} \cdot N_{sc}^{RB}$$

Base station assigns a set of VRBs for the user equipment by the uplink scheduling grant signaling. Specifically, a Resource Indication Value (RIV) is given in a resource allocation field of the UL grant. The RIV indicates initial location $RB_{START}$ and length $L_{CRBs}$ of a set of consecutive VRBs by a tree representation mode, wherein $RB_{START}$ is an index of an initial VRB of the set of consecutive VRBs, $L_{CRBs}$ is the number of VRBs included in the set of consecutive VRBs.

In an LTE system in a sub-frame, for a user equipment, at most one uplink scheduling grant signaling is sent to the user equipment by a PDCCH with DCI format 0.

Figure 3:
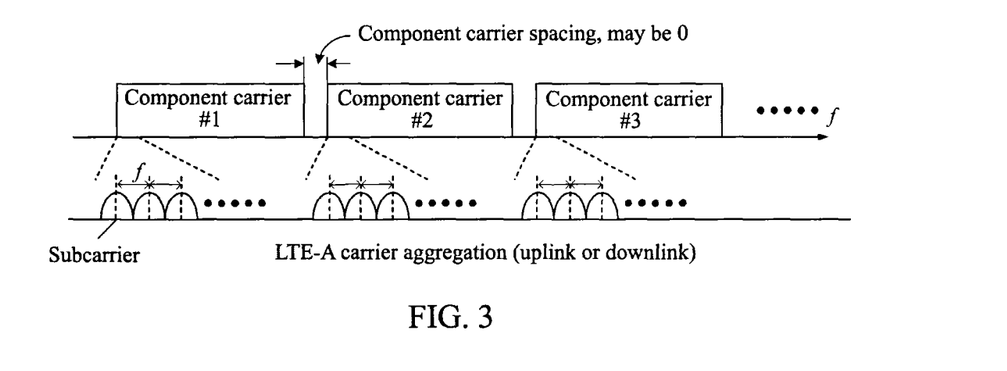
FIG. 3 is a schematic diagram of carrier aggregation of an LTE-A system.

An LTE-Advanced (called as LTE-A system for short) is the next generation evolution system of the LTE system. As shown in FIG. 3, the LTE-A system extends transmission bandwidth by adopting carrier aggregation technology, and each aggregated carrier is called as a "component carrier". Multiple component carriers may be consecutive or may be non-consecutive, and are located at a same frequency band, or may be located at different frequency bands.

Figure 4:
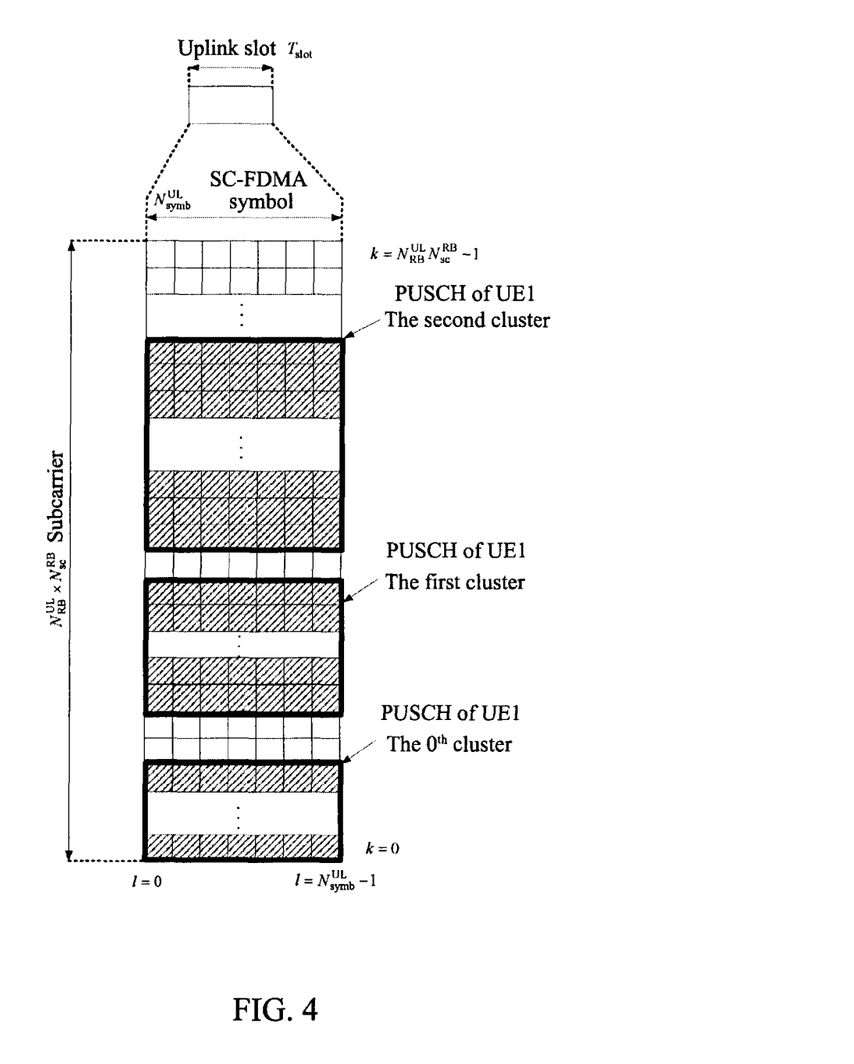
FIG. 4 is a schematic diagram of PUSCH non-consecutive resource allocation in a component carrier of an LTE-A system.

In an LTE-A system in a component carrier, a consecutive or non-consecutive resource allocation mode may be adopted for the PUSCH of the user equipment. The consecutive resource allocation refers to that the PUSCH of the user equipment occupies a section of consecutive bandwidth in a component carrier; the non-consecutive resource allocation refers to that the PUSCH of the user equipment occupies multiple sections of bandwidth in a component carrier, the sections of bandwidth are consecutive, each section of bandwidth includes a set of consecutive PRB, which is called as a cluster, as shown in FIG. 4.

The base station notifies the user equipment of a resource allocation of a physical uplink shared channel in a component carrier by an uplink scheduling grant signaling. When resource is allocated for the PUSCH using the non-consecutive resource allocation mode, the following problems exist.

The user equipment needs to be notified of the resource allocation of each cluster by an uplink scheduling grant signaling, however when there are multiple clusters, if an uplink scheduling grant signaling is sent for each cluster, then the reliability of transmitting the uplink scheduling grant signaling is reduced, thereby causing reducing of transmission performance of the PUSCH; if the resource allocation of all of the clusters are sent by an uplink scheduling grant signaling, then the number of clusters occupied by the PUSCH should be limited, which influences the flexibility of the resource allocation.

SUMMARY OF THE INVENTION

The present invention provides a method for sending uplink scheduling grant signaling and a base station, to solve a problem of low reliability of the uplink scheduling grant signaling transmission and poor flexibility for resource allocation.

A method for sending uplink scheduling grant signaling, comprising:

a base station, according to a number of clusters occupied with non-consecutive resource allocation by a Physical Uplink Shared Channel (PUSCH) of a scheduled user equipment in a component carrier, configuring at least one uplink scheduling grant signaling for the user equipment, wherein each uplink scheduling grant signaling indicates an allocation of resource for one or two clusters occupied by the PUSCH; and the base station allocating a Physical Downlink Control Channel (PDCCH) for each uplink scheduling grant signaling, and sending the uplink scheduling grant signaling to the user equipment.

The non-consecutive resource occupied by the PUSCH is divided into four clusters;

the step of configuring at least one uplink scheduling grant signaling comprises:

the base station configuring two uplink scheduling grant signalings indicating allocation of resource for two clusters respectively.

The non-consecutive resource occupied by the PUSCH is divided into three clusters;

the step of configuring at least one uplink scheduling grant signaling comprises:

the base station configuring an uplink scheduling grant signaling indicating allocation of resource for one cluster, and another uplink scheduling grant signaling indicating allocation of resource for other two clusters.

The non-consecutive resource occupied by the PUSCH is divided into two clusters;

the step of configuring at least one uplink scheduling grant signaling comprises:

the base station configuring an uplink scheduling grant signaling indicating allocation of resource for two clusters.

The step of the base station allocating a PDCCH for each uplink scheduling grant signaling, and sending the uplink scheduling grant signaling to the user equipment comprises:

the base station making the uplink scheduling grant signaling indicating allocation of resource for two clusters be carried in a downlink control information format 0A, and adding a flag bit to the downlink control information format 0A or adding a mask to a cyclical redundancy code (CRC) of the downlink control information format 0A, indicating that the downlink control information format is 0, and then sending to the user equipment through a PDCCH; or the base station making the uplink scheduling grant signaling indicating allocation of resource for a cluster be carried in a downlink control information format 0, and adding a flag bit to the downlink control information format 0 or adding a MASK to the CRC of the downlink control information format 0, indicating that the downlink control information format is 0, and then sending to the user equipment through a PDCCH, wherein the downlink control information format 0A and the downlink control information format 0 have a same signaling overhead, the downlink control information format 0 is configured to be frequency hopping not available.

In multiple uplink scheduling grant signalings configured for the user equipment by the base station, other uplink scheduling information than the uplink scheduling information indicating resource allocation is the same, the other uplink scheduling information includes a modulation coding mode and redundancy version, a new data indication, a transmission power control command used for the scheduled PUSCH, an uplink indication or a downlink allocation indication and a channel state indication request; and in multiple uplink scheduling grant signalings configured by the base station for the user equipment, cyclic shifts indicated for demodulation reference signals are same or different, that is, different uplink scheduling grant signalings indicate that demodulation reference signals of the PUSCH in different clusters adopt same or different cyclic shifts.

There are at most two uplink scheduling grant signalings configured by the base station for each user equipment.

The invention further provides a base station, applied in an LTE-A, comprising:

a signaling configuring module, which is configured to: according to a number of clusters occupied by a Physical Uplink Shared Channel (PUSCH) of a scheduled user equipment in a component carrier, configure at least one uplink scheduling grant signaling for the user equipment, wherein each uplink scheduling grant signaling indicates an allocation of resource for one or two clusters occupied by the PUSCH; and a signaling sending module, which is configured to: allocate a Physical Downlink Control Channel (PDCCH) for each uplink scheduling grant signaling, and sending the uplink scheduling grant signaling to the user equipment.

The non-consecutive resource occupied by the PUSCH is divided into four clusters;

the signaling configuring module is configured to configure at least one uplink scheduling grant signaling by the following way of: the base station configuring two uplink scheduling grant signalings indicating allocation of resource for two clusters respectively.

The non-consecutive resource of the PUSCH is divided into three clusters;

the signaling configuring module is configured to configure at least one uplink scheduling grant signaling by the following way of: the base station configuring an uplink scheduling grant signaling indicating allocation of resource for one cluster, and another uplink scheduling grant signaling indicating allocation of resource for other two clusters.

The non-consecutive resource occupied by the PUSCH is divided into two clusters;

the signaling configuring module is configured to configure at least one uplink scheduling grant signaling by the following way of: the base station configuring an uplink scheduling grant signaling indicating allocation of resource for two clusters.

The signaling configuring module is configured to assign a PDCCH for each uplink scheduling grant signaling and send the uplink scheduling grant signaling to the user equipment by the following way:

the signaling sending module making the uplink scheduling grant signaling indicating allocation of resource for two clusters be carried in a downlink control information format 0A, and adding a flag bit to the downlink control information format 0A or adding a mask to a cyclical redundancy code (CRC) of the downlink control information format 0A, indicating that the downlink control information format is 0, and then sending to the user equipment through a PDCCH; or the signaling sending module making the uplink scheduling grant signaling indicating allocation of resource for a cluster be carried in a downlink control information format 0, and adding a flag bit to the downlink control information format 0 or adding a MASK to the CRC of the downlink control information format 0, indicating that the downlink control information format is 0, and then sending to the user equipment through a PDCCH, wherein the downlink control information format 0A and the downlink control information format 0 have a same signaling overhead, the downlink control information format 0 is configured to be frequency hopping not available.

In multiple uplink scheduling grant signalings configured for the user equipment by the signaling configuring module, other uplink scheduling information than the uplink scheduling information indicating resource allocation is the same, the other uplink scheduling information includes a modulation coding mode and redundancy version, a new data indication, a transmission power control command used for the scheduled PUSCH, an uplink indication or a downlink allocation indication and a channel state indication request; and in multiple uplink scheduling grant signalings configured by the signaling configuring module for the user equipment, cyclic shifts indicated for demodulation reference signals are same or different, that is, different uplink scheduling grant signalings indicate that demodulation reference signals of the PUSCH in different clusters adopt same or different cyclic shifts.

The base station configures at least two uplink scheduling grant signalings for each user equipment.

Embodiments of the present invention provide a method for sending uplink scheduling grant signaling and a base station, when allocating resource for the PUSCH by using a non-consecutive resource allocation mode, the base station configures at least one uplink scheduling grant signaling according to the number of the clusters occupied by the PUSCH, wherein each uplink scheduling grant signaling indicates allocation of resource for one or two clusters occupied by the PUSCH; and sends to the scheduled user equipment. The flexibility of the resource allocation in the case of multiple clusters is enhanced, meanwhile the reliability of transmission of the scheduling grant signaling is ensured.

PREFERRED EMBODIMENTS OF THE PRESENT INVENTION

There are 3 ways of downlink resource allocation of an LTE system: type 0, type 1 and type 2, wherein type 1 allocates channel resource in a unit of Resource Block Group (called as RBG for short). The RBG is defined as a set of consecutive PRBs, the size of the resource block group (RBG size, as the number of the included PRBs) is a function of the system bandwidth. As shown in TABLE 1, the bandwidth of the LTE system may be configured as 1.4 MHz, 3 MHz, 5 MHz, 10 MHz, 15 MHz and 20 MHz, corresponding to numbers of the PRBs of 6, 15, 25, 50, 75 and 100. According to different system bandwidth $N_{RB}^{DL}$, the sizes of the resource block groups are different, as the granularity of the resource allocation is different, as seen in TABLE 2.

TABLE 1

| | Channel bandwidth $BW_{Channel}$ [MHz] (system bandwidth) | | | | | |
|---|---|---|---|---|---|---|
| | 1.4 | 3 | 5 | 10 | 15 | 20 |
| Transmission bandwidth configuration $N_{RB}^{DL}$ (number of PRBs corresponding to the system bandwidth) | 6 | 15 | 25 | 50 | 75 | 100 |

TABLE 2

| System Bandwidth $N_{RB}^{DL}$ (# PRB) | RBG SizeP (# PRB) |
|---|---|
| ≤10 | 1 |
| 11-26 | 2 |
| 27-63 | 3 |
| 64-110 | 4 |

In an uplink of an LTE-A system, a consecutive resource allocation in a component carrier is in a unit of PRB, while the non-consecutive resource allocation is in a unit of RBG.

In the LTE-A system, when resource is allocated for the PUSCH in a non-consecutive resource allocation mode, an uplink scheduling grant signaling may be sent for each cluster, and the channel resource allocated to this cluster is indicated using a tree representation mode in the LTE system; the uplink scheduling signaling of each cluster is sent in the separate PDCCH with DCI format 0. Thereby, for a PUSCH of non-consecutive resource allocation, in a sub-frame for a user equipment, multiple uplink scheduling grant signalings are sent to it through multiple PDCCHs with DCI format 0. This method undoubtedly increases the overhead of the uplink scheduling grant signalings, and a case of loss of part of the uplink scheduling grant signalings, which are of large number, may occur during transmission, if the user equipment can not receive all of the uplink scheduling grant signalings correctly, the uplink data PUSCH then can not be sent correctly, which reduces the reliability of the transmission of the uplink scheduling grant signaling, thereby causing a decreasing of the transmission performance of the PUSCH.

In addition, the signaling overhead may also be reduced by way of limiting numbers of the clusters, i.e. the signaling overhead may be limited in a component carrier, and the PUSCH of one user equipment may occupy X sections of bandwidths (X clusters) at most. Thereby, one uplink scheduling grant signaling is sent for the PUSCH in a component carrier of a user equipment; by way of introducing new resource allocation indication mode, the uplink scheduling grant signaling indicates the channel resource allocated for each cluster. In order to make the uplink scheduling grant signaling UL grant using the new resource allocation mode match the DCI format 0 in signaling overhead, then number of the clusters needs to be limited, such as X=2, thereby the flexibility of the resource allocation is limited.

For the PUSCH of the non-consecutive resource allocation, it becomes a problem demanding prompt solution that how to send the uplink scheduling grant signaling to indicate the allocated channel resource and meanwhile to satisfy the reliability of the transmission of the uplink scheduling grant signaling and the flexibility of the resource allocation.

In order to solve the above problem, embodiments of the present invention provide[s] a method for sending uplink scheduling grant signaling in an LTE-A system, each of the embodiments will be described respectively in combination with drawings as follows.

Figure 5:
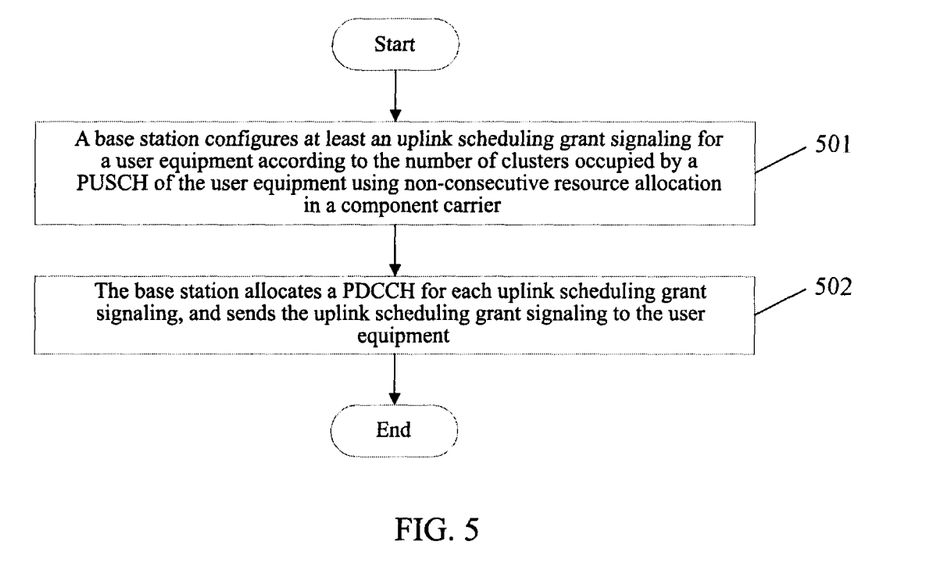
FIG. 5 is a flowchart of a method for sending uplink scheduling grant signaling provided by an embodiment of the present invention.

Embodiment 1 of the present invention provides a method for sending uplink scheduling grant signaling, and as shown in FIG. 5, the method comprises the following steps.

In step 501, a base station, according to the number of clusters occupied with non-consecutive resource allocation by a PUSCH of a scheduled user equipment in a component carrier, configures at least one uplink scheduling grant signaling for the user equipment.

In this step, a physical uplink shared channel transmission for a user equipment in a component carrier adopts non-consecutive resource allocation, which is divided into four clusters, the base station sends two uplink scheduling grant signalings for the user equipment.

In step 502, the base station allocates a PDCCH for each uplink scheduling grant signaling, and sends the uplink scheduling grant signaling to the user equipment.

In this step, the two uplink scheduling grant signalings are sent in two physical downlink control channels respectively.

Each uplink scheduling grant signaling indicates the allocation of resource for two clusters of the four clusters, and is carried in a downlink control information format 0A (DCI format 0A), and is sent to the scheduled user equipment by the physical downlink control channel.

In the two uplink scheduling grant signalings, other uplink scheduling information than the uplink scheduling information for the resource allocation is the same, the other uplink scheduling information includes a modulation coding mode and redundancy version, a new data indication, a transmission power control demand used for the scheduled PUSCH, a cyclic shift of a demodulation reference signal and a channel state indication request.

Embodiment 2 of the present invention provides a method for sending uplink scheduling grant signaling, in this embodiment of the present invention, a physical uplink shared channel transmission for a user equipment in a component carrier adopts non-consecutive resource allocation, which is divided into three clusters, the base station sends two uplink scheduling grant signalings for the user equipment.

The two uplink scheduling grant signalings are sent in two physical downlink control channels respectively.

Wherein one of the uplink scheduling grant signalings indicates the resource allocation for two clusters of the three clusters, and is carried in a downlink control information format 0A (DCI format 0A), and is sent to the scheduled user equipment by a physical downlink control channel.

The other uplink scheduling grant signaling indicates the resource allocation of the other cluster of the three clusters, and is carried in a downlink control information format 0 (DCI format 0), and is sent to the scheduled user equipment by a physical downlink control channel.

In the two uplink scheduling grant signalings, other uplink scheduling information than that of the resource allocation is the same, and the other uplink scheduling information includes a modulation coding mode and redundancy version, a new data indication, a transmission power control demand used for the scheduled PUSCH, an uplink indication and a channel state indication request.

In the two uplink scheduling grant signalings, the cyclic shifts of the indicated demodulation reference signals are different.

The base station adds a flag bit into the downlink control information format 0A, or adds a MASK0A to a Cyclical Redundancy Check (CRC) of the downlink control information format 0A, indicating that the format of the downlink control information is 0A; the base station adds a flag bit into the downlink control information format 0 or adds a mask MASK0 to the CRC of the downlink control information format 0, indicating that the downlink control information format is 0; the downlink control information format 0A and the downlink control information format 0 have the same signaling overhead.

Embodiment 3 of the present invention provides a method for sending uplink scheduling grant signaling, in this embodiment of the present invention, the physical uplink shared channel transmission of a user equipment in a component carrier adopts non-consecutive resource allocation, wherein the physical uplink shared channel is divided into two clusters, the base station sends an uplink scheduling grant signaling for the user equipment, the uplink scheduling grant signaling indicates the resource allocation of the two clusters, and the uplink scheduling grant signaling is carried in the downlink control information format 0A (DCI format 0A) and is sent to the scheduled user equipment by the physical downlink control channel.

It should be noted that, in an LTE-A system in a component carrier, if the PUSCH of the same user equipment occupies too much non-consecutive bandwidth (as clusters), a problem of too large overhead may be brought when the resource allocation is indicated by multiple uplink scheduling grant signalings, and the reliability of the uplink scheduling grant signalings is reduced, which thereby causes decreasing of the transmission performance of the PUSCH. In addition, if there are too many configured clusters supported in an uplink scheduling grant signaling, then it can not match DCI format 0 in signaling overhead. So in general condition, each uplink scheduling grant signaling supports configuring resource allocation of one or two clusters, the optimal scheme is that the number of the clusters of the non-consecutive resource occupied by the PUSCH of the same user equipment is not greater than four. When an uplink scheduling grant signaling supports resource allocation of more than two clusters or the PUSCH of the same one user equipment in a component carrier occupies more than four clusters, the transmission of the uplink scheduling grant signaling may be completed by a method for sending uplink scheduling grant signaling provided by an embodiment of the present invention.

Figure 6:
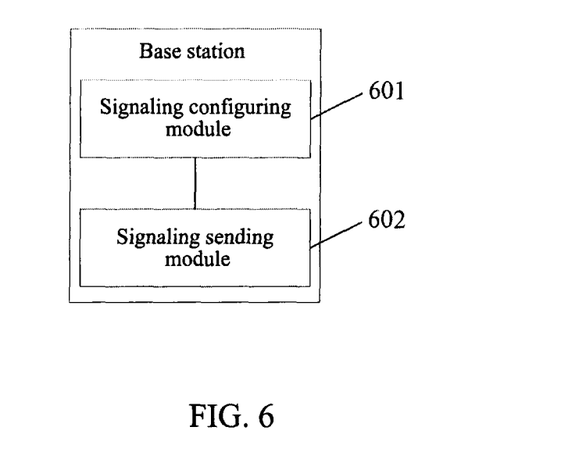
FIG. 6 is a structure schematic diagram of a base station provided by an embodiment of the present invention.

An embodiment of the present invention also provides a base station, a structure of the base station is as shown in FIG. 6, comprising:

a signaling configuring module 601, which is configured to: configure at least an uplink scheduling grant signaling according to the number of clusters occupied by the PUSCH, each uplink scheduling grant signaling indicates the allocation of resource for one or two clusters occupied by the PUSCH; and a signaling sending module 602, which is configured to: configure a PDCCH for each uplink scheduling grant signaling, and send to the scheduled user equipment.

Wherein, the signaling configuring module 601 may be configured to configure uplink scheduling grant signaling according to the number of clusters of different non-consecutive resource, for example, when the non-consecutive resource of the PUSCH is divided into four clusters, configure two uplink scheduling grant signalings indicating allocation of resource of two clusters;

when the non-consecutive resource of the PUSCH is divided into three clusters, an uplink scheduling grant signaling indicating allocation of resource of a cluster and an uplink scheduling grant signaling supporting allocation of resource of other two clusters are configured;

when the non-consecutive resource of the PUSCH is divided into two clusters, an uplink scheduling grant signaling indicating allocation of resource of two clusters is configured.

The signal sending module 602 sends different uplink scheduling grant signalings by different PDCCHs, and only one uplink scheduling grant signaling can be sent by one PDCCH.

Specifically, when the uplink scheduling grant signaling indicates allocation of resource for two clusters, the signaling sending module 602 makes the uplink scheduling grant signaling be carried in the downlink control information format 0A, and sends it by a PDCCH; when the uplink scheduling grant signaling indicates allocation of resource of a cluster, the uplink scheduling grant signaling is carried in the downlink control information format 0 and sent by a PDCCH.

The above base station may be combined with a method for sending uplink scheduling grant signaling provided by embodiments of the present invention, when allocating resource for the PUSCH using a non-consecutive resource allocation mode, the base station configures at least an uplink scheduling grant signaling, each uplink scheduling grant signaling supports allocation of resource for at least a cluster, and sends at least an uplink scheduling grant signaling by the PDCCH, which ensures the reliability of the transmission of the scheduling grant signaling at the same time as enhancing allocation sending efficiency of resource for multiple clusters, thereby the resource allocation are more flexible in the case of multiple clusters.

Those of ordinary skill in the art should understand that the whole or part of steps of the above-mentioned method may be completed by program instructing relevant hardware, the program may be stored in a computer readable storage medium, when the program is executed, one or combination of the steps of embodiments of the method are included.

In addition, each function unit in each embodiment of the present invention may be implemented in form of hardware, or may be implemented in form of software function module. The integrated modules may be stored in a computer readable storage medium, can be implemented in form of software function module, and can be sold or used as separate products.

The above-mentioned storage medium may be read-only storage, disk or compact disk, and so on.

By the invention, when allocating resource for the PUSCH by using a non-consecutive resource allocation mode, the base station configures at least one uplink scheduling grant signaling according to the number of the clusters occupied by the PUSCH, wherein each uplink scheduling grant signaling indicates allocation of resource for one or two clusters occupied by the PUSCH; and sends to the scheduled user equipment. The flexibility of the resource allocation in the case of multiple clusters is enhanced, meanwhile the reliability of transmission of the scheduling grant signaling is ensured.

INDUSTRIAL APPLICABILITY

When allocating resource for the PUSCH using non-consecutive allocation mode, the base station configures at least an uplink scheduling grant signaling according to the number of the clusters occupied by the PUSCH, each uplink scheduling grant signaling indicates the allocation of one or two clusters of resource occupied by the PUSCH, and sends it to the scheduled user equipment by a PDCCH, enhancing the flexibility of the resource allocation in the case of multiple clusters, and ensuring the reliability of the transmission of the scheduling grant signaling meanwhile.

What is claimed is:

1. A method for sending uplink scheduling grant signaling, applied in an Advanced Long Term Evolution (LTE-A) system, comprising:

a base station, according to a number of clusters occupied with non-consecutive resource allocation by a Physical Uplink Shared Channel (PUSCH) of a scheduled user equipment in a component carrier, configuring at least one uplink scheduling grant signaling for the user equipment, wherein each uplink scheduling grant signaling indicates an allocation of resource for one or two clusters occupied by the PUSCH; wherein when non-consecutive resource occupied by the PUSCH is divided into four clusters, the base station configures two uplink scheduling grant signalings indicating allocation of resource for two clusters respectively; when non-consecutive resource occupied by the PUSCH is divided into three clusters, the base station configures one uplink scheduling grant signaling indicating allocation of resource for one cluster, and another one uplink scheduling grant signaling indicating allocation of resource for other two clusters; when non-consecutive resource occupied by the PUSCH is divided into two clusters, the base station configures one uplink scheduling grant signaling indicating allocation of resource for two clusters; and the base station allocating a Physical Downlink Control Channel (PDCCH) for each uplink scheduling grant signaling, and sending the uplink scheduling grant signaling to the user equipment.

2. The method according to claim 1, wherein, the step of the base station allocating a PDCCH for each uplink scheduling grant signaling, and sending the uplink scheduling grant signaling to the user equipment comprises:

the base station making the uplink scheduling grant signaling indicating allocation of resource for two clusters be carried in a downlink control information format 0A, and adding a flag bit to the downlink control information format 0A or adding a mask to a cyclical redundancy code (CRC) of the downlink control information format 0A, indicating that the downlink control information format is 0, and then sending to the user equipment through a PDCCH; or the base station making the uplink scheduling grant signaling indicating allocation of resource for a cluster be carried in a downlink control information format 0, and adding a flag bit to the downlink control information format 0 or adding a MASK to the CRC of the downlink control information format 0, indicating that the downlink control information format is 0, and then sending to the user equipment through a PDCCH, wherein the downlink control information format 0A and the downlink control information format 0 have a same signaling overhead, the downlink control information format 0 is configured to be frequency hopping not available.

3. The method according to claim 1, wherein, in multiple uplink scheduling grant signalings configured for the user equipment by the base station, other uplink scheduling information than the uplink scheduling information indicating resource allocation is the same, the other uplink scheduling information includes a modulation coding mode and redundancy version, a new data indication, a transmission power control command used for the scheduled PUSCH, an uplink indication or a downlink allocation indication and a channel state indication request; and in multiple uplink scheduling grant signalings configured by the base station for the user equipment, cyclic shifts indicated for demodulation reference signals are same or different, that is, different uplink scheduling grant signalings indicate that demodulation reference signals of the PUSCH in different clusters adopt same or different cyclic shifts.

4. The method according to claim 1, wherein, there are at most two uplink scheduling grant signalings configured by the base station for each user equipment.

5. A base station, applied in an LTE-A, comprising:

a signaling configuring module, which is configured to: according to a number of clusters occupied by a Physical Uplink Shared Channel (PUSCH) of a scheduled user equipment in a component carrier, configure at least one uplink scheduling grant signaling for the user equipment, wherein each uplink scheduling grant signaling indicates an allocation of resource for one or two clusters occupied by the PUSCH; wherein when non-consecutive resource occupied by the PUSCH is divided into four clusters, the base station configures two uplink scheduling grant signalings indicating allocation of resource for two clusters respectively; when non-consecutive resource occupied by the PUSCH is divided into three clusters, the base station configures one uplink scheduling grant signaling indicating allocation of resource for one cluster, and another one uplink scheduling grant signaling indicating allocation of resource for other two clusters; when non-consecutive resource occupied by the PUSCH is divided into two clusters, the base station configures one uplink scheduling grant signaling indicating allocation of resource for two clusters; and a signaling sending module, which is configured to: allocate a Physical Downlink Control Channel (PDCCH) for each uplink scheduling grant signaling, and sending the uplink scheduling grant signaling to the user equipment.

6. The base station according to claim 5, wherein, the signaling configuring module is configured to assign a PDCCH for each uplink scheduling grant signaling and send the uplink scheduling grant signaling to the user equipment by the following way:

the signaling sending module making the uplink scheduling grant signaling indicating allocation of resource for two clusters be carried in a downlink control information format 0A, and adding a flag bit to the downlink control information format 0A or adding a mask code (MASK) to a cyclical redundancy code (CRC) of the downlink control information format 0A, indicating that the downlink control information format is 0, and then sending to the user equipment through a PDCCH; or the signaling sending module making the uplink scheduling grant signaling indicating allocation of resource for a cluster be carried in a downlink control information format 0, and adding a flag bit to the downlink control information format 0 or adding a MASK to the CRC of the downlink control information format 0, indicating that the downlink control information format is 0, and then sending to the user equipment through a PDCCH, wherein the downlink control information format 0A and the downlink control information format 0 have a same signaling overhead, the downlink control information format 0 is configured to be frequency hopping not available.

7. The base station according to claim 5, wherein, in multiple uplink scheduling grant signalings configured for the user equipment by the signaling configuring module, other uplink scheduling information than the uplink scheduling information indicating resource allocation is the same, the other uplink scheduling information includes a modulation coding mode and redundancy version, a new data indication, a transmission power control command used for the scheduled PUSCH, an uplink indication or a downlink allocation indication and a channel state indication request; and in multiple uplink scheduling grant signalings configured by the signaling configuring module for the user equipment, cyclic shifts indicated for demodulation reference signals are same or different, that is, different uplink scheduling grant signalings indicate that demodulation reference signals of the PUSCH in different clusters adopt same or different cyclic shifts.

8. The base station according to claim 5, wherein, the base station configures at least two uplink scheduling grant signalings for each user equipment.

* * * * *